(12) United States Patent
Kaiser (10) Patent No.: US 9,127,625 B2
(45) Date of Patent: Sep. 8, 2015

(54) AIR FILTER

(71) Applicant: Mahle International GmbH, Stuttgart (DE)

(72) Inventor: Sven A. Kaiser, Winnenden (DE)

(73) Assignee: MAHLE INTERNATIONAL GMBH (DE)

(*) Notice: Subject to any disclaimer, the term of this patent is extended or adjusted under 35 U.S.C. 154(b) by 0 days.

(21) Appl. No.: 14/362,072

(22) PCT Filed: Nov. 27, 2012

(86) PCT No.: PCT/EP2012/073689
§ 371 (c)(1),
(2) Date: Nov. 3, 2014

(87) PCT Pub. No.: WO2013/079467
PCT Pub. Date: Jun. 6, 2013

(65) Prior Publication Data
US 2015/0096273 A1    Apr. 9, 2015

(30) Foreign Application Priority Data

Dec. 1, 2011 (DE) .......................... 10 2011 087 526

(51) Int. Cl.
*B01D 46/10* (2006.01)
*B01D 46/00* (2006.01)
(Continued)

(52) U.S. Cl.
CPC ......... *F02M 35/02416* (2013.01); *B01D 46/10* (2013.01); *B01D 46/2411* (2013.01);
(Continued)

(58) Field of Classification Search
USPC ........ 55/385.3, 503, 490, 495, 502, 511, 529; 123/198 E
See application file for complete search history.

(56) References Cited

U.S. PATENT DOCUMENTS 4,713,097 A * 12/1987 Grawi et al. ..................... 96/380
4,826,517 A * 5/1989 Norman .......................... 55/418
(Continued)

FOREIGN PATENT DOCUMENTS

DE        10058478 A1    5/2002
DE    102004026105 A1   12/2004
(Continued)

OTHER PUBLICATIONS

English abstract for DE-10058478.
(Continued)

*Primary Examiner* — Duane Smith
*Assistant Examiner* — Minh-Chau Pham
(74) *Attorney, Agent, or Firm* — Fishman Stewart Yamaguchi PLLC (57) ABSTRACT

An air filter for a fresh air system of an internal combustion engine may include a housing having a first housing shell and a second housing shell. An intermediate panel may be disposed therebetween separating a crude chamber from a clean chamber in the housing. The intermediate panel may have a passage opening. A filter element may be arranged in the passage opening, and the filter element may include a surrounding seal. The intermediate panel may include a surrounding seal contour on an inside edge bordering the passage opening, and the seal may rest on the seal contour. A fixing frame may be configured as a separate component with respect to the intermediate panel, the two housing shells, and the filter component. The fixing frame may encompass a side of the seal facing away from the seal contour along the filter element and be secured to the intermediate panel.

19 Claims, 5 Drawing Sheets

(51) Int. Cl.
*F02M 35/04* (2006.01)
*F02M 35/024* (2006.01)
*F02M 35/02* (2006.01)
*B01D 46/24* (2006.01)

(52) U.S. Cl.
CPC ..... *F02M35/0203* (2013.01); *F02M 35/02408* (2013.01); *F02M 35/02433* (2013.01); *F02M 35/02491* (2013.01); *B01D 2277/20* (2013.01)

(56) References Cited

U.S. PATENT DOCUMENTS

| | | | | |
|---|---|---|---|---|
| 4,861,359 | A | * | 8/1989 | Tettman .......................... 55/419 |
| 5,120,334 | A | * | 6/1992 | Cooper .......................... 96/422 |
| 6,375,700 | B1 | * | 4/2002 | Jaroszczyk et al. ............. 55/498 |
| 6,387,143 | B1 | * | 5/2002 | Adiletta .......................... 55/497 |
| 6,409,784 | B1 | * | 6/2002 | Wehr .......................... 55/385.3 |
| 6,422,197 | B1 | * | 7/2002 | Amann et al. ............. 123/198 E |
| 6,482,247 | B2 | * | 11/2002 | Jaroszczyk et al. ............. 55/484 |
| 7,314,558 | B1 | * | 1/2008 | Jaroszczyk et al. ........ 210/493.1 |
| 7,323,106 | B2 | * | 1/2008 | Jaroszczyk et al. ........ 210/493.1 |
| 7,507,279 | B2 | * | 3/2009 | Mizutani et al. ................. 96/135 |
| 8,668,756 | B2 | * | 3/2014 | Zou et al. ......................... 55/503 |

FOREIGN PATENT DOCUMENTS

| | | |
|---|---|---|
| DE | 20320861 U1 | 5/2005 |
| DE | 102005031501 A1 | 1/2007 |
| DE | 102006039952 A1 | 3/2008 |
| DE | 202011050533 U1 | 8/2011 |
| EP | 1305519 A1 | 5/2003 |
| JP | 11-125158 | 5/1999 |
| WO | WO-2009/007052 A1 | 1/2009 |

OTHER PUBLICATIONS

English abstract DE-20320861.
English abstract for DE-102004026105.
English abstract for DE-102005031501.
English abstract for DE-102006039952.
Eng. abstract for JP11-125158.

* cited by examiner

AIR FILTER

CROSS-REFERENCE TO RELATED APPLICATIONS

This application claims priority to German Patent Application DE 10 2011 087 526.3 filed Dec. 1, 2011 and International Patent Application PCT/EP2012/073689 filed Nov. 27, 2012, both of which are hereby incorporated by reference in their entirety.

TECHNICAL FIELD

The present invention relates to an air filter, particularly for a fresh air system of an internal combustion engine, preferably for a motor vehicle. The invention relates, furthermore, to a method for the production of such an air filter.

BACKGROUND

An air filter is known from DE 10 2006 039 952 A1, which comprises a housing, an intermediate panel and a filter element. The housing has a first housing shell and a second housing shell. The intermediate panel separates a crude chamber from a clean chamber in the housing and has a passage opening. The filter element is installed in the passage opening. By the use of an intermediate panel as carrier for the filter element, the housing can be configured with regard to its shaping largely independently of the shape of the filter element. Hereby, available structural spaces can be better utilized.

It has been found that a tight separation between clean chamber and crude chamber in the housing is a problem.

SUMMARY

The present invention is concerned with the problem of indicating for an air filter of the type mentioned in the introduction an improved embodiment which is distinguished in particular by an effective seal. In addition, a capability of being assembled simply is aimed for.

This problem is solved according to the invention by the subjects of the independent claims. Advantageous embodiments are the subject of the dependent claims.

The invention is based on the general idea of equipping the filter element with a surrounding seal, which in the assembled state comes to lie in a sealing manner against a surrounding seal contour, wherein this seal contour is constructed on an inside edge bordering the passage opening of the intermediate panel. In this way, the filter element closes the passage opening in a gas-tight or respectively air-tight manner, so that the air must inevitably flow through the filter element in order to come from the crude chamber to the clean chamber.

The use of such an intermediate panel makes it possible in particular to accommodate identical filter elements in different housings, or to arrange different filter elements in identical housings. In these cases, the intermediate panel serves as an adapter.

The intermediate panel here is preferably a separate component with respect to the two housing shells. The filter element with the seal mounted thereon is a separate component with respect to the intermediate panel and with respect to the two housing shells. Preferably, the housing is realized in a two-shell type of construction, so that only the two housing shells are provided, which together with the intermediate panel complete the housing. In this case, the clean chamber is delimited by the intermediate panel and the one or first housing shell, whilst the crude chamber is delimited by the intermediate panel and the other or second housing shell.

According to a particularly advantageous embodiment, in addition a fixing frame can be provided, which runs around on a side of the seal facing away from the seal contour, along the filter element, and is fastened on the intermediate panel. By means of such a fixing frame, on the one hand the tightness can be ensured with increased reliability, because by means of the fixing frame a stationary support is created in the region of the seal. Through the installation of the fixing frame, the seal is arranged between the seal contour and the fixing frame.

The fixing frame is preferably a separate component with respect to the intermediate panel and with respect to the two housing shells. The fixing frame is also a separate component with respect to the filter element which is equipped with the seal.

According to an advantageous further development, the fixing frame can pre-tension the seal against the seal contour, which improves the efficiency of the seal.

In a further advantageous further development, the seal can be securely connected with the filter element. The fixing frame, on the other hand, is preferably loosely arranged with respect to the filter element. The filter element can thereby be secured on the intermediate panel by means of the fixing frame. In other words, the filter element is installed into the intermediate panel by means of its seal in the region of the passage opening, whereby a positioning of the filter element takes place on the intermediate panel. Through the mounting of the fixing frame, the fastening of the filter element on the intermediate panel then takes place. Therefore, a separate fixing or direct fixing of the filter element on the intermediate panel can be dispensed with. In particular, therefore, the filter element can be fastened on the intermediate panel exclusively by means of the fixing frame.

Expediently, the fixing frame can be fastened on the intermediate panel by means of clip elements, which simplifies the installation, because separate fastening means can be dispensed with. In particular here the clip elements can be formed integrally on the fixing frame, which reduces the manufacturing expenditure.

The intermediate panel can have counter clip elements in a complementary manner to the clip elements of the fixing frame, which counter clip elements cooperate with the clip elements of the fixing frame for fastening the fixing frame on the intermediate panel. Such counter clip elements simplify the installation. It is also expedient here to form the counter clip elements integrally on the intermediate panel, in order to reduce the manufacturing expenditure.

The seal can form, on its side facing away from the seal contour, a preferably closed surrounding seal channel, which has in particular a U-shaped cross-sectional profile. Hereby, the seal has a certain elasticity in radial direction, whereby the seal can come to lie with radial pre-stressing radially against the seal contour. Furthermore, it is basically possible to form a surrounding edge on the fixing frame, which edge projects at least partially into the channel of the seal. For example, axial pre-stressing forces can be transferred onto the seal via the edge. In so far as the edge is formed in a complementary manner to the channel, a radial pre-stressing can also be introduced into the seal via the edge.

According to another advantageous embodiment, the seal contour can form a preferably closed surrounding contour channel, which expediently has a U-shaped cross-sectional profile. The seal is installed into this contour channel. By means of the channel, a mount for the seal is therefore defined, which simplifies the installation and the realization of an efficient seal. In particular, the seal and the channel can be coordinated with one another geometrically so that the seal comes to lie axially and radially internally and also radially externally against the seal contour. The sealing effect is then of particularly high quality. Optionally, provision can be made in addition that the seal can dip so far into the channel that it also comes to lie axially against the seal contour.

Expediently, provision can be made in a further development that the fixing frame has a preferably closed surrounding edge, the external contour of which is shaped in a complementary manner to an internal contour of an outer wall of the channel. Consequently, the fixing frame can close by its edge the channel with the seal installed therein. In particular, the edge of the fixing frame can dip here at least partially into the channel.

According to another embodiment, the intermediate panel can be welded at its surrounding outside edge with an edge of the first housing shell facing the second housing shell. Such a welded connection can be produced comparatively simply and leads to an efficient seal between the first housing shell and the intermediate panel.

In another embodiment, the intermediate panel can be fastened at its surrounding outside edge by means of clip elements to an edge of the second housing shell facing the first housing shell. In other words, the second housing shell is not fastened directly to the first housing shell, but rather is fastened directly to the intermediate panel, whereas the intermediate panel is expediently fastened directly to the first housing shell. In particular, provision can be made that the intermediate panel is connected inseparably with the first housing shell, whereas it is detachably connected with the second housing shell, expediently by means of the clip elements. Said clip elements can preferably be formed integrally on the intermediate panel.

In another embodiment, the inside edge of the intermediate panel can be spaced apart from an outside edge of the intermediate panel along the entire periphery. Whereas the inside edge surrounds the passage opening, the outside edge is arranged axially between edges of the housing shells facing one another. By the distance between inside edge and outside edge, the geometry of the inside edge can be shaped completely independently of the geometry of the outside edge. Furthermore, the filter element is then surrounded completely by an air volume inside the housing. The air volume forms a thermal insulation for the filter element, in particular for the seal.

A particular advantage of the type of construction presented here emerges when a material is used for the seal of the filter element, the temperature stability of which is less than the temperature stability of the materials of the housing shells and of the intermediate panel. High-grade seal materials have a relatively low temperature stability compared with typical plastics of housing shells. Usually, an air filter is arranged in an engine compartment of a vehicle, so that during the operation of the internal combustion engine, temperatures can definitely occur in the region of the air filter which exceed a threshold temperature for the stability of the seal material. Through the positioning of the filter element which is presented here in the interior of the filter housing by means of an intermediate panel, the thermal load of the seal can be considerably reduced. This applies in particular for the case where the inside edge the intermediate edge is spaced apart from the outside edge of the intermediate panel. During operation of the internal combustion engine, in addition fresh air is drawn in permanently, whereby the filter element and the seal are cooled. When the internal combustion engine is switched off, the air volume forms an insulation surrounding the seal of the filter element, which protects the seal from heat acting from the exterior. This is advantageous in particular during the post-heating phase, which occurs immediately after the switching off of the internal combustion engine and in which no more fresh air is drawn in, whilst the internal combustion engine is still very hot due to the preceding combustion processes, and accordingly emits a great deal of heat.

In another advantageous embodiment, the filter element can be configured to be flat and to lie in a filter plane. Flat filter elements can also be designated as panel filters. They can have a rectangular external contour and can expediently have a folded filter material. The intermediate panel can be configured to be flat in a region adjoining the inside edge and can lie in a panel plane. Expediently, the filter plane and the panel plane can now be inclined with respect to one another. Hereby, it is possible to position the filter element in the interior of the housing completely independently of the position of a separating plane between the housing shells, whereby the configuration of the filter housing can be carried out depending on the conditions of the structural space and independently of the geometry of the filter element.

The present invention also relates to a method for the production of such an air filter. According to a production method according to the invention, firstly the intermediate panel is fastened to the first housing shell, for example by means of a welding method. The filter element is then installed into the passage opening of the intermediate panel, so that the seal lies against the seal contour. Thereafter, the fixing frame is mounted, in order to fix the filter element on the intermediate panel. Expediently here, the fixing frame is clipped on the intermediate panel. Finally, the second housing shell is fastened to the intermediate panel, expediently by clipping. Therefore, an assembly for the air filter results which is particularly simple to realize and is able to be carried out manually.

Further important features and advantages of the invention will emerge from the subclaims, from the drawings and from the associated description of the figures with the aid of the drawings.

It shall be understood that the features mentioned above and to be further explained below are able to be used not only in the respectively indicated combination, but also in other combinations or in isolation, without departing from the scope of the present invention.

Preferred example embodiments of the invention are represented in the drawings and are explained in further detail in the following description, wherein identical reference numbers refer to identical or similar or functionally identical components.

BRIEF DESCRIPTION OF THE DRAWINGS

There are shown, respectively diagrammatically.

DETAILED DESCRIPTION

According to FIGS. 1 to 10, an air filter 1, which is expediently used in a fresh air system of an internal combustion engine and namely preferably in a motor vehicle, comprises a housing 2, an intermediate panel 3 and a filter element 4. The housing 2 has a first housing shell 5 and a second housing shell 6. The intermediate panel 3 separates a crude chamber 7 from a clean chamber 8 in the housing 2 and has a passage opening 9. The filter element 4 is installed in the passage opening 9. The first housing shell 5 has an air outlet 10 on the clean side. The second housing shell 6 has an air inlet 11 on the crude side. An outside edge 12 of the intermediate panel is arranged between an edge 13 of the first housing shell 5 and an edge 14 of the second housing shell 6.

The filter element 4 has a surrounding seal 15, which is expediently made from a suitable seal material. The seal 15 can be injected or foamed here onto a filter body 16 of the filter element 4. The filter body 16 consists of a filter material which in particular can be web-shaped and folded. Preferably, the filter material and the seal material are different. For example, the seal 15 consists of polyurethane and namely in particular of a polyurethane foam.

The intermediate panel 3 has an inside edge 17, which surrounds the passage opening 9 and has a surrounding seal contour 18. In the assembled state, the seal 15 lies against the seal contour 18.

The air filter 1 which is presented here comprises in addition a fixing frame 19. The latter is arranged on a side of the seal 15 facing away from the seal contour 18. Here, the fixing frame 19 is fastened to the intermediate panel 3, e.g. in the region of the inside edge 17. Furthermore, the fixing frame 19 runs along the filter element 4 in a closed manner in the circumferential direction. In the assembled state, the seal 15 is arranged between the seal contour 18 and the fixing frame 19. Expediently, the fixing frame 19 can pre-stress the seal 15 against the seal contour 18.

The seal 15 is expediently connected securely with the filter element 4. As stated, the seal 15 can be injected or foamed onto the filter body 16. The fixing frame 19 is arranged loosely with respect to the filter element 4, so that therefore no fixed connection is present between the fixing frame 19 and the filter element 4. The filter element 4 is now secured on the intermediate panel 3 by means of the fixing frame 19. Here, the fixing frame 19 can be fastened to the intermediate panel 3 expediently by means of clip elements 20. In the example, these clip elements 20 are formed integrally on the fixing frame 19. In the example, the clip elements 20 cooperate with counter clip elements 21, which are constructed on the intermediate panel 3, for fastening the fixing frame 19 on the intermediate panel 3. Expediently, the counter clip elements 21 are also formed integrally on the intermediate panel 3. In the example, the counter clip elements 21 are arranged in the region of the inside edge 17.

On its side facing away from the seal contour 18, the seal 15 can have a closed surrounding channel 22, which has a U-shaped or V-shaped cross-sectional profile.

The seal contour 18 has, in turn, a closed surrounding channel 23, which has a U-shaped cross-sectional profile. The seal 15 is installed into the channel 23 of the seal contour 18. Expediently, the seal 15 and the channel 23 of the seal contour 18 are coordinated with one another geometrically so that the seal 15 comes to lie radially internally and also radially externally against the seal contour 18. The channel 22 of the seal 15 enables here a radial elasticity of the seal 15, which leads to a radial pre-stressing of the seal 15 on the seal contour 18 radially internally and radially externally. In the example, in FIG. 1 an axial distance can be seen axially between the seal 15 and the seal contour 18, so that no axial contact is present between seal 15 and seal contour 18. Equally, however, a configuration is conceivable, in which the seal 15 additionally also comes in contact axially with the seal contour 18.

The fixing frame 19 has a closed surrounding edge 24, the external contour of which is shaped expediently in a complementary manner to an internal contour of an outer wall 25 of the channel 23 of the seal contour 18. In the assembled state, the fixing frame 19 can therefore close with its edge 24 the channel 23 of the seal contour 18. Likewise, the supporting frame 24 can dip here at least partially into the said channel 23.

In the finished assembled state, the intermediate panel 3 is welded at its outside edge 12 with the edge 13 of the first housing shell 5. Furthermore, the intermediate panel 3 is fastened at its outside edge 12 by means of clip elements 26 to the edge 14 of the second housing shell 6. These clip elements 26 are also expediently formed integrally on the intermediate panel 3.

Figure 4:
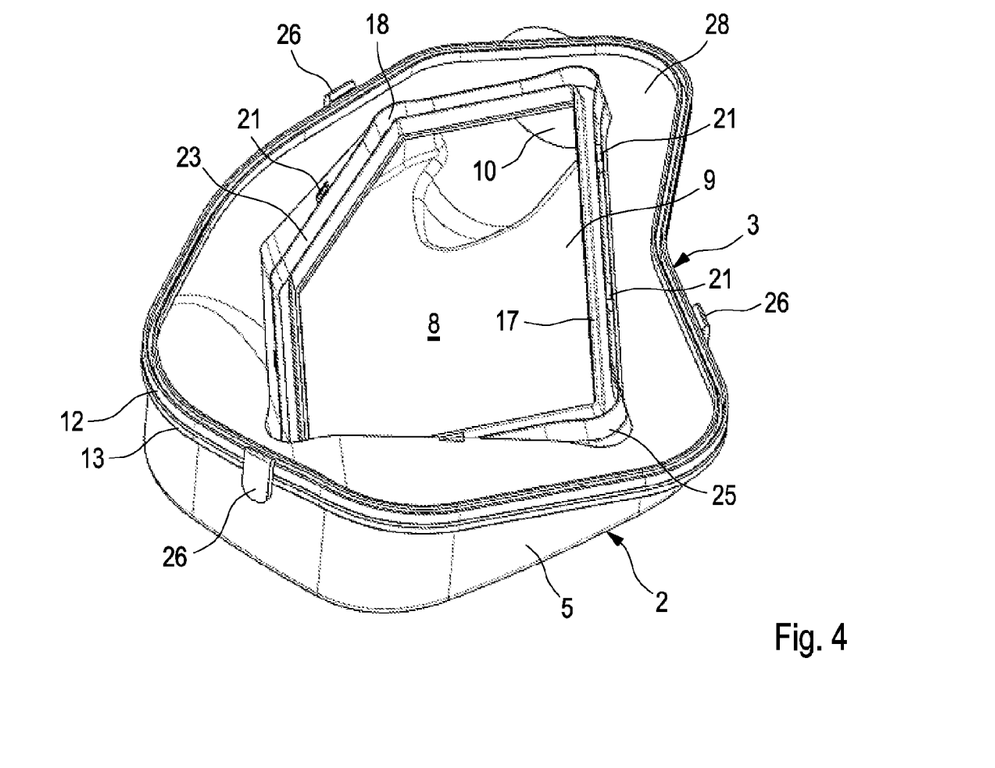

As can be seen in particular from FIG. 4, the inside edge 17 of the intermediate panel 3 is spaced apart from the outside edge 12 of the intermediate panel 3 along the entire circumference. Furthermore, the filter element 4 is configured as a flat filter element 4, in particular as a panel filter element, so that it lies in a filter plane 27 indicated by a dot-and-dash line in FIG. 1. The intermediate panel 3 is configured to be flat in a region 28, which adjoins the inside edge 17 and surrounds the latter in a substantially circumferential section, so that said region 28 lies in a panel plane 29 indicated by a dot-and-dash line in FIG. 1. As can be seen, the filter plane 27 and the panel plane 29 now run in an inclined manner with respect to one another.

Expediently, all the components of the air filter 1 are made from plastic, wherein the same plastic can be used for the housing shells 5, 6, the intermediate panel 3 and the fixing frame 19. The filter body 16 of the filter element 4 expediently consists of a different plastic from the seal material of the seal 15, wherein at least the seal material of the seal 15 consists of a different plastic from the housing shells 5, 6, the intermediate panel 3 and the fixing frame 19.

The seal material of the seal 15 has a temperature resistance which is less than that of the material of the housing shell 5, 6 and/or of the intermediate panel 3. In order to protect the seal 15 from too great an action of heat, the seal 15 is arranged at a distance, provided in a surrounding manner, from the edge 12. Therefore, an air volume, formed in a surrounding manner, is present between the edge 12 and the seal 15, which air volume forms a protection from too great an action of heat, in particular during a post-heating phase on switching off of the internal combustion engine. The air volume is formed here in the region 28, as can be seen in particular from FIG. 4.

A method for the production of such an air filter 1 is explained in further detail below with the aid of FIGS. 3 to 10.

Figure 1:
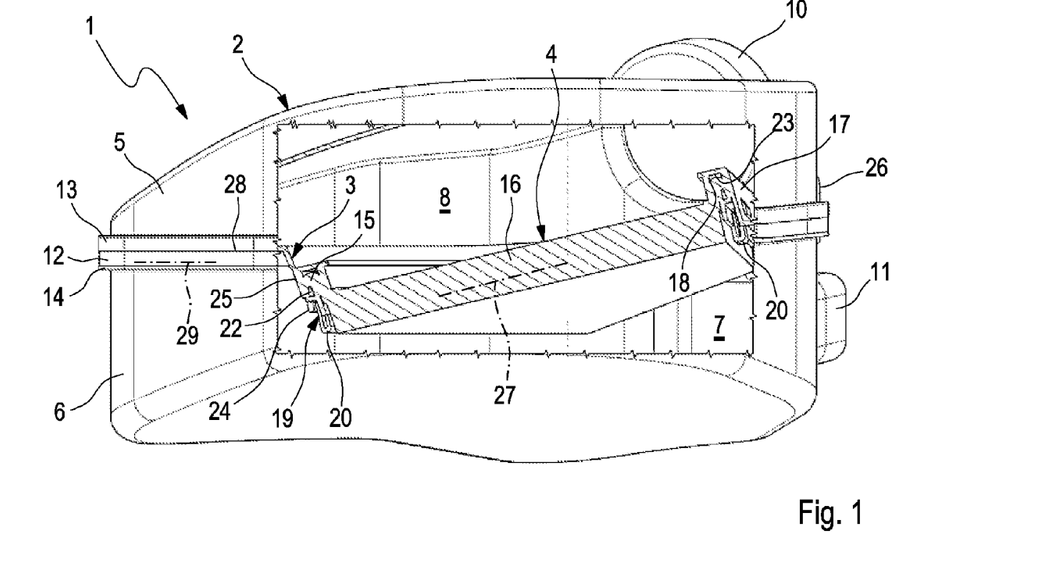
FIG. 1 a side view of an air filter, partially in section.
Figure 2:
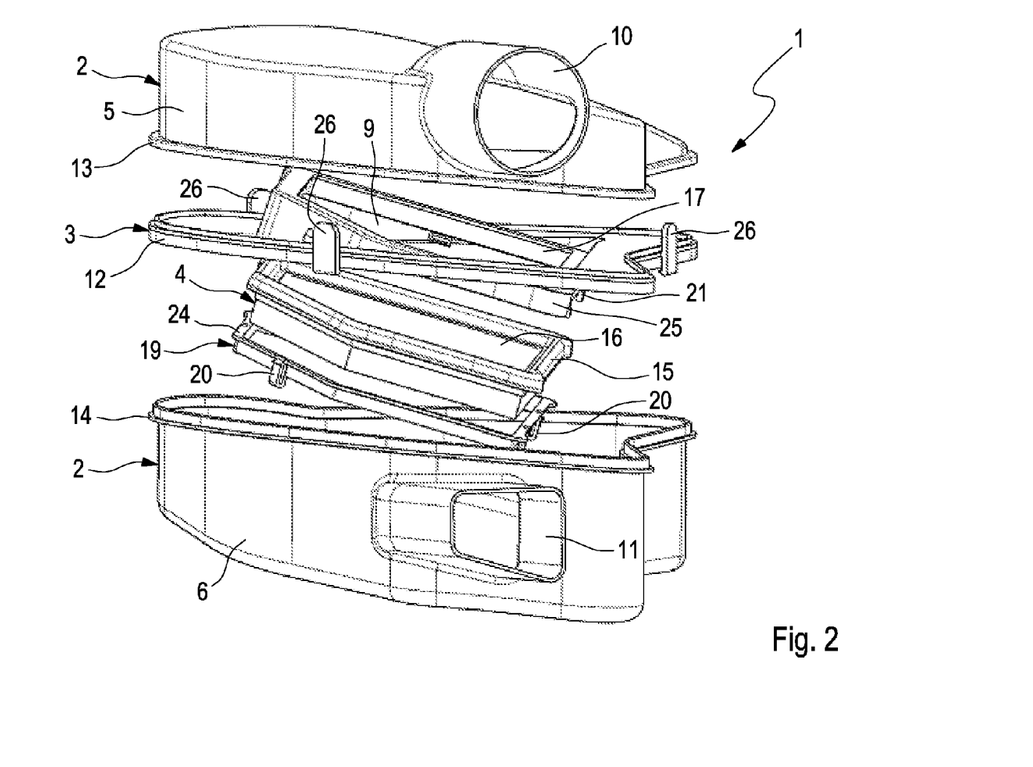
FIG. 2 an exploded isometric view of the air filter.
Figure 3:
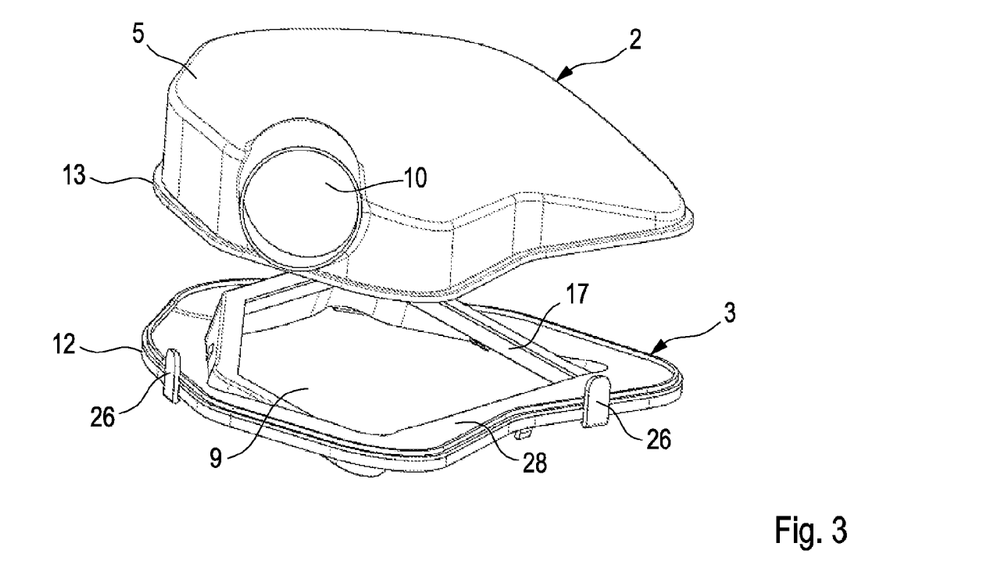
FIG. 3-10 isometric views of the air filter in different phases of manufacture.

According to FIG. 3, firstly the intermediate panel 3 is fastened to the first housing shell 5. A welding process is preferred here, in particular a friction welding process or a laser welding method.

According to FIG. 4, an assembly is now present consisting of the first housing shell 5 and the intermediate panel 3, which contains the clean chamber 8.

Figure 5:
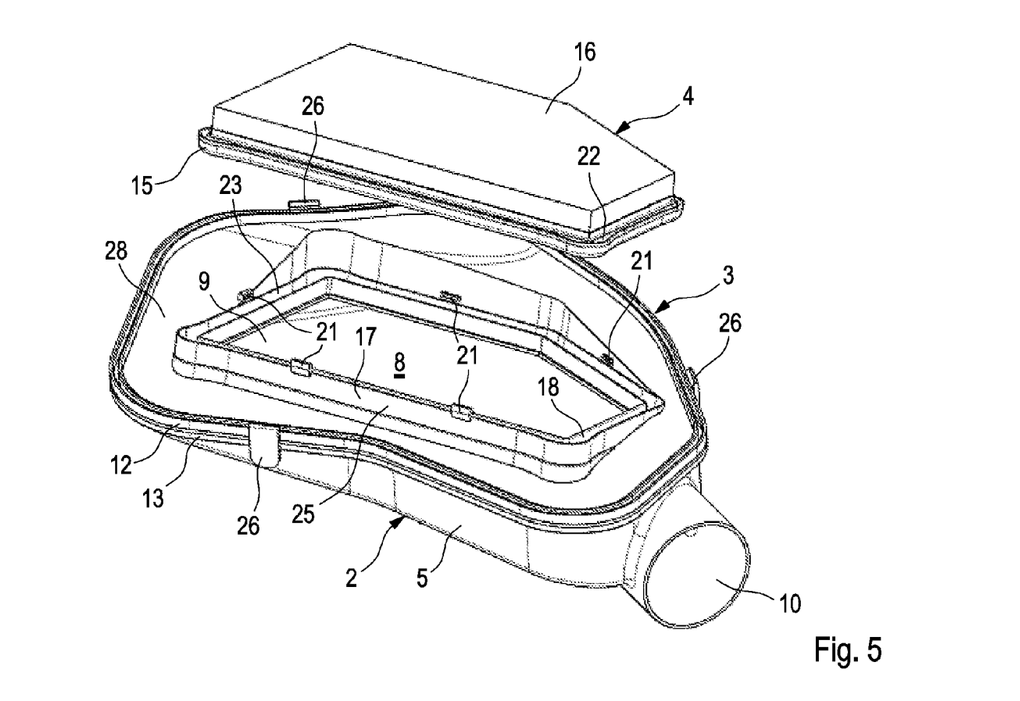

According to FIG. 5, the filter element 4 is now installed, wherein the filter element 4 closes the passage opening 9 with its filter body 16. At the same time, the seal 15 is installed here into the channel 23 of the seal contour 18.

Figure 6:
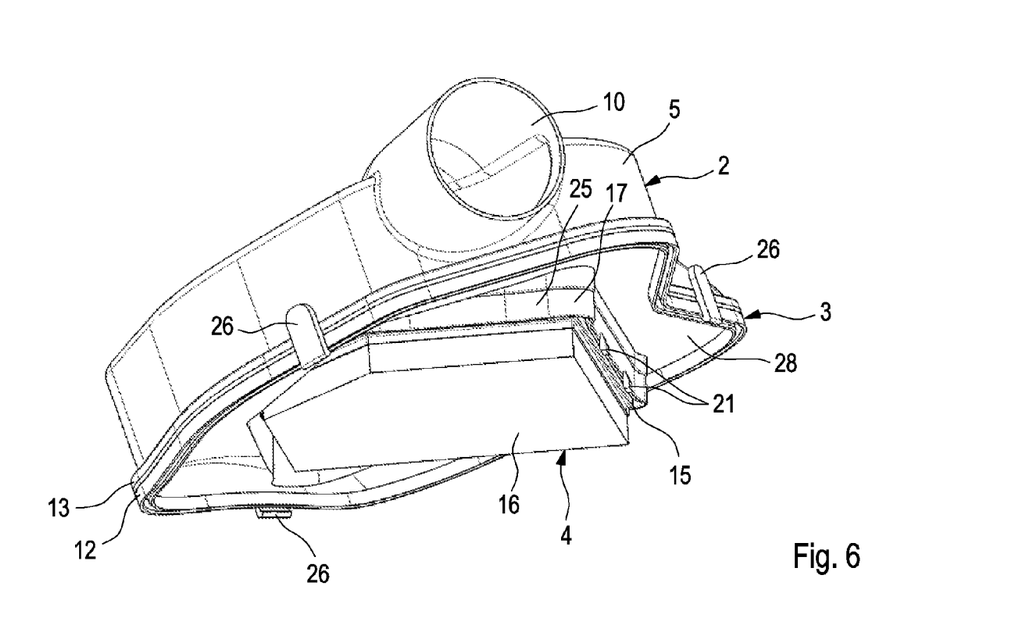

According to FIG. 6, an assembly of first housing shell 5, intermediate panel 3 and filter element 4 is now present.

Figure 7:
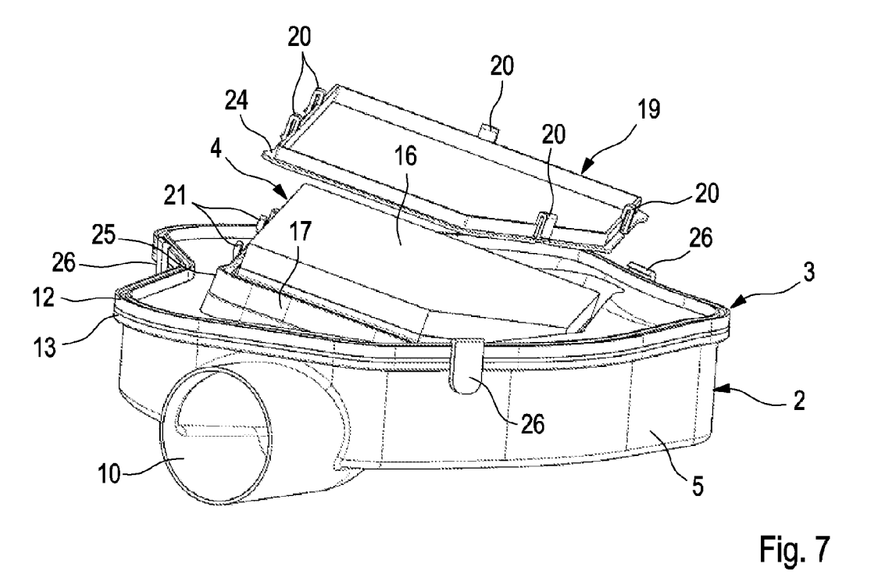

According to FIG. 7 the fixing frame 19 is then installed. The latter is fastened, namely clipped, on the intermediate panel 3, wherein the clip elements 20 cooperate with the counter clip elements 21.

Figure 8:
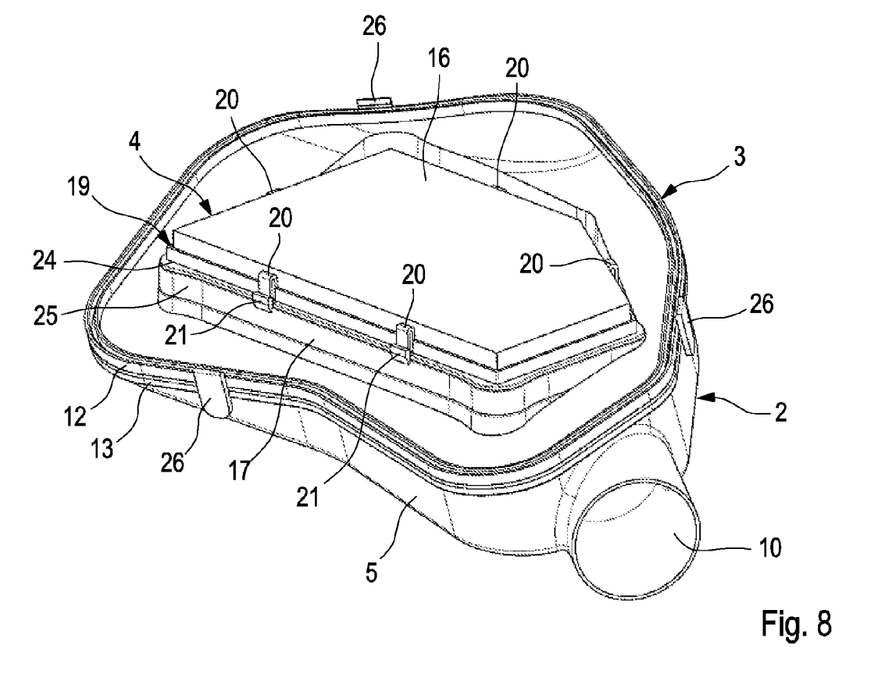

According to FIG. 8, an assembly consisting of the first housing shell 5, the intermediate panel 3, the filter element 4 and the fixing frame 19 is now present.

Figure 9:
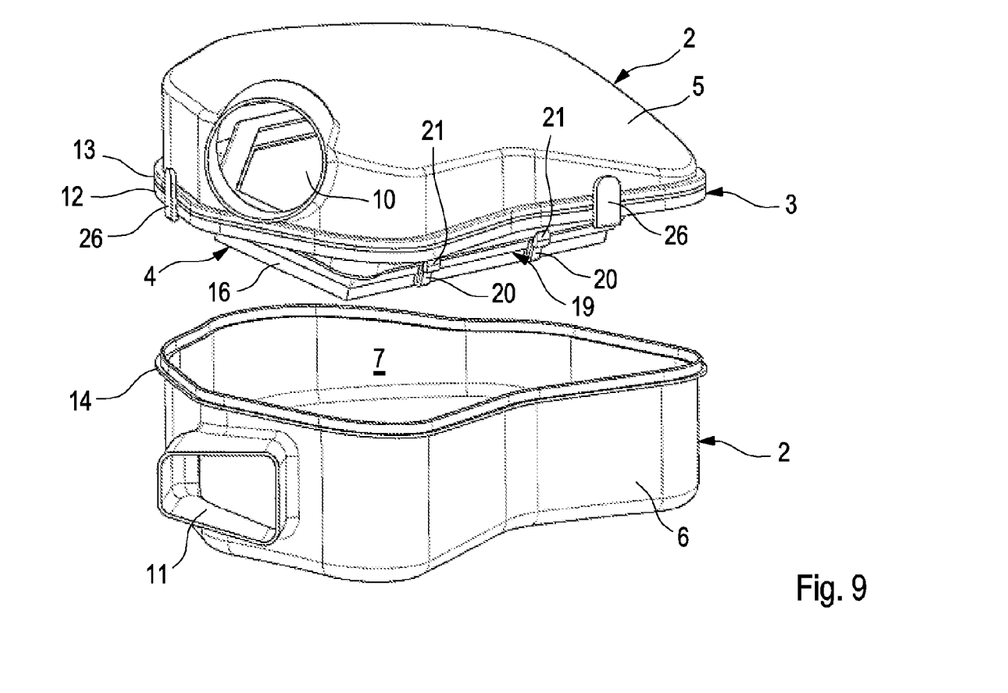

Subsequently, according to FIG. 9 the second housing shell 6 can be installed on the aforementioned assembly. For this, the second housing shell 6 is fastened on the intermediate panel 3, namely clipped by means of the clip elements 26.

Figure 10:
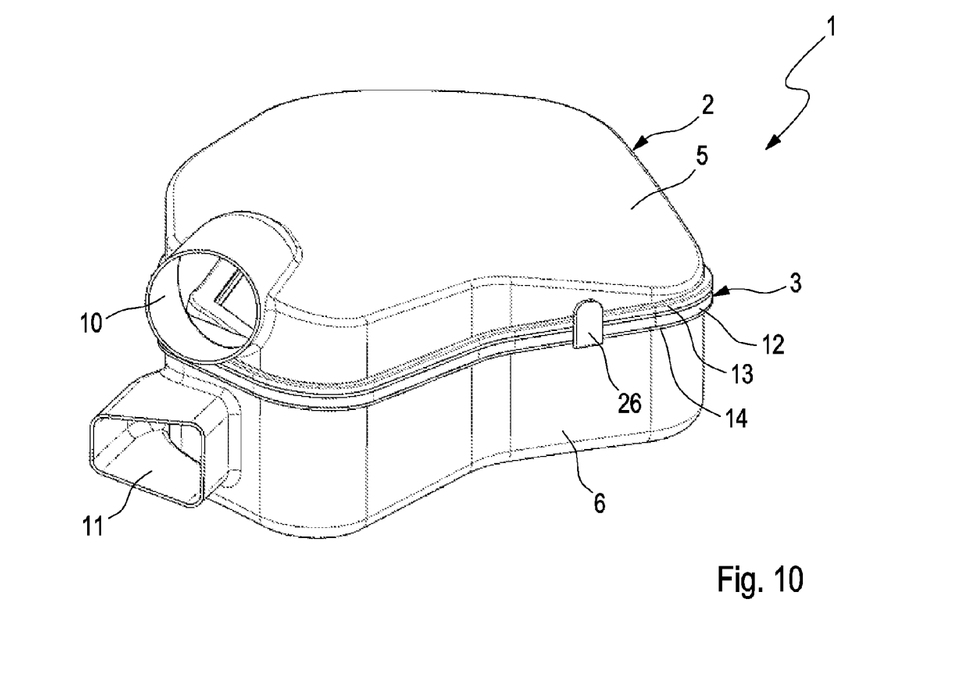

Finally, according to FIG. 10 the complete air filter 1 is present, which consists of the first housing shell 5, the intermediate panel 3, the filter element 4, the fixing frame 19 and the second housing shell 6.

The invention claimed is:

1. An air filter for a fresh air system of an internal combustion engine, comprising:
    a housing having a first housing shell and a second housing shell,
    an intermediate panel disposed therebetween separating a crude chamber from a clean chamber in the housing, the intermediate panel defining a periphery coupled to the housing and including an inside edge delimiting a passage opening,
    a filter element arranged in the passage opening,
    the filter element having a surrounding seal disposed thereon and extending in a circumferential direction around the filter element,
    wherein the intermediate panel has a surrounding seal contour on the inside edge bordering the passage opening, and the seal interacts with the seal contour and the filter element, and
    a fixing frame configured as a separate component with respect to the intermediate panel, the two housing shells and the filter element, the fixing frame encompassing the filter element in the circumferential direction on a side of the seal facing away from the seal contour, wherein the fixing frame mounts the side of the seal facing away from the seal contour and is secured to the intermediate panel.

2. The air filter according to claim 1, wherein the fixing frame pre-stresses the seal against the seal contour.

3. The air filter according to claim 1, wherein the fixing frame is directly secured to the intermediate panel via a fastener.

4. The air filter according to claim 1, wherein the fixing frame is loosely arranged with respect to the filter element.

5. The air filter according to claim 1, wherein the filter element is secured on the intermediate panel via the fixing frame.

6. The air filter according to claim 1, wherein the fixing frame is secured to the intermediate panel by clip elements.

7. The air filter according to claim 6, wherein the intermediate panel has counter clip elements, which cooperate with the clip elements of the fixing frame for securing the fixing frame on the intermediate panel.

8. The air filter according to claim 1, wherein the fixing frame is spaced away and decoupled from the first housing shell and the second housing shell.

9. The air filter according to claim 1, wherein the fixing frame has a surrounding edge defining an external contour shaped complementary to an internal contour of an outer wall of the seal contour.

10. The air filter according to claim 1, wherein the intermediate panel includes a surrounding outside edge welded to an edge of the first housing shell facing the second housing shell.

11. The air filter according to claim 1, wherein the intermediate panel includes a surrounding outside edge fastened to an edge of the second housing shell facing the first housing shell via clip elements.

12. The air filter according to claim 1, wherein:
    the filter element is flat and lies in a filter plane,
    the intermediate panel is flat in a region adjoining an inside edge and lies in a panel plane, and
    the filter plane runs in an incline with respect to the panel plane.

13. The air filter according to claim 7, wherein at least one of the clip elements and the counter clip elements are formed integrally with the fixing frame and intermediate panel, respectively.

14. The air filter according to claim 1, wherein the intermediate panel is configured as a separate component with respect to the fixing frame, the first housing shell, the second housing shell and the filter element.

15. An air filter for a fresh air system, comprising:
    a housing including a first housing shell coupled to a second housing shell along an interface;
    an intermediate panel disposed in the housing and separating a crude chamber from a clean chamber in the housing, the intermediate panel including an inside edge delimiting a passage opening and an outside edge defining a periphery of the intermediate panel corresponding to the interface, the outside edge being secured to the housing, wherein the outside edge is spaced apart from the inside edge a distance away from the housing along the periphery of the intermediate panel;
    a filter element arranged in the passage opening and configured to be penetrated by a fluid flow, the filter element including a filter body for filtering the fluid flow; and
    a sealing element encompassing a periphery of the filter body;
    wherein the inside edge of the intermediate panel includes a surrounding seal contour being profiled complementary to the sealing element, the sealing element resting against the filter body and the seal contour to define a fluid-tight seal around the passage opening.

16. The air filter according to claim 14, wherein the outside edge of the intermediate panel is welded to an edge of the first housing shell facing the second housing shell.

17. The air filter according to claim 14, wherein the outside edge of the intermediate panel is fastened to an edge of the second housing shell facing the first housing shell via a plurality of clip elements.

18. An air filter for a fresh air system, comprising:
    a housing having a first housing shell and a second housing shell,
    an intermediate panel disposed therebetween separating a crude chamber from a clean chamber in the housing, the intermediate panel defining a periphery coupled to the housing and including an inside edge delimiting a passage opening;
    a filter element arranged in the passage opening and configured to be penetrated axially by a fluid flow, the filter element including a filter body for filtering the fluid flow;
    a sealing element disposed on and encompassing a periphery of the filter body;
    wherein the intermediate panel includes a seal contour surrounding the inside edge and bordering the passage opening, the seal contour defining a surrounding channel having opposing channel walls, wherein the sealing element rests along the channel and is coordinated with the channel geometrically such that the sealing element engages the opposing channel walls and the filter body to define a fluid-tight seal around the passage opening.

19. An air filter for a fresh air system, comprising:
    a housing having a first housing shell and a second housing shell,
    an intermediate panel disposed therebetween separating a crude chamber from a clean chamber in the housing, the intermediate panel defining a periphery coupled to the housing and including an inside edge delimiting a passage opening;

a filter element arranged in the passage opening and configured to be penetrated by a fluid flow, the filter element including a filter body for filtering the fluid flow;

a sealing element disposed on and surrounding a periphery of the filter body;

wherein the inside edge defines a seal contour surrounding the passage opening, and the sealing element interacts with the seal contour and the filter body to define a fluid-tight seal around the passage opening;

wherein the sealing element is spaced apart from the housing and includes a temperature stability less than a temperature stability of the first housing shell, the second housing shell and the intermediate panel, respectively.

* * * * *